(12) United States Patent
Schwaller et al.

(10) Patent No.: US 7,648,330 B2
(45) Date of Patent: Jan. 19, 2010

(54) NOISE CONTROL

(75) Inventors: Peter J G Schwaller, Derby (GB); Nigel H S Smith, Derby (GB)

(73) Assignee: Rolls-Royce plc, London (GB)

( * ) Notice: Subject to any disclaimer, the term of this patent is extended or adjusted under 35 U.S.C. 154(b) by 782 days.

(21) Appl. No.: 11/152,505

(22) Filed: Jun. 15, 2005

(65) Prior Publication Data
US 2006/0029493 A1   Feb. 9, 2006

(30) Foreign Application Priority Data
Jul. 15, 2004   (GB) ................. 0415844.0

(51) Int. Cl.
 *F04D 29/66*   (2006.01)
(52) U.S. Cl. .......................... 415/1; 415/119
(58) Field of Classification Search ................. 415/119, 415/1; 416/203
See application file for complete search history.

(56) References Cited

U.S. PATENT DOCUMENTS

| | | | |
|---|---|---|---|
| 2,989,136 A * | 6/1961 | Wohlberg | 181/224 |
| 3,574,477 A * | 4/1971 | Dolf et al. | 415/60 |
| 4,732,532 A * | 3/1988 | Schwaller et al. | 415/119 |
| 5,448,645 A * | 9/1995 | Guerci | 381/71.14 |
| 5,478,199 A * | 12/1995 | Gliebe | 415/119 |
| 5,537,861 A * | 7/1996 | Seitelman et al. | 73/66 |
| 5,681,145 A * | 10/1997 | Neely et al. | 416/203 |
| 5,966,452 A * | 10/1999 | Norris | 381/71.1 |
| 5,966,525 A * | 10/1999 | Manzi et al. | 703/8 |
| 6,158,690 A * | 12/2000 | Wadey et al. | 244/17.27 |
| 6,260,660 B1 * | 7/2001 | Yoerkie et al. | 181/290 |
| 6,973,193 B1 * | 12/2005 | Tse et al. | 381/17 |

FOREIGN PATENT DOCUMENTS

| | | |
|---|---|---|
| EP | 0 145 857 A | 6/1985 |
| GB | 2 054 058 A | 2/1981 |

* cited by examiner

*Primary Examiner*—Edward Look
*Assistant Examiner*—Sean J Younger
(74) *Attorney, Agent, or Firm*—Jeffrey S. Melcher; Manelli Denison & Selter PLLC

(57) ABSTRACT

Noise control with respect to rotating machinery such as gas turbine engines is important to meet acceptable operational and environmental constraints. Buzz-saw noise in particular is due to differences in blade to blade geometries both as assembled and due to blade manufacturing tolerance variations. Generally, a plurality of blades rotate within a duct and some noise propagates forwards of the blade assembly. In order to abate such noise an acoustic lining is provided. By consideration of the acoustic attenuation effects of that lining, it is possible to rearrange the blades within the blade assembly such that the overall noise attenuation effects are improved. Thus, the blade assembly may be rearranged such that there is a reduction in the Fourier coefficients at harmonics above and below the harmonics most attenuated by the acoustic attenuation treatment or lining or alternatively the effect of that lining maximized by rearrangement of the blades to shift the harmonics to those most attenuated by the acoustic treatment.

12 Claims, 4 Drawing Sheets

Non-uniform Blade Stagger

NOISE CONTROL

FIELD OF THE INVENTION

The present invention relates to noise control and more particularly to noise control with regard to rotating machinery such as a gas turbine engine.

BACKGROUND OF THE INVENTION

Control of noise is important as sensitivity to the perceived environment increases. Thus, such rotating machinery as gas turbine engines and in particular such engines used for aircraft operations are constantly reviewed in terms of noise targets. Clearly, these noise targets are increasingly stringent with an ongoing objective to reduce environmental and where appropriate aircraft cabin noise. Nevertheless, rotating machinery by its nature will create noise and in particular so called buzz saw noise generated by the rotating fan assembly.

Buzz-saw noise occurs when the fan assembly operates with the rotor blade tips—or a lower span of the rotor blades—at sonic or supersonic Mach numbers, i.e. when $M_r>1$. Where $M_r$ is the resultant rotor relative tip Mach number associated with the inlet fluid flow Mach number in the stationary frame of reference, $M_a$ and the effective blade tip circumferential Mach number $M_t$. i.e. $M_r=\sqrt{(M_t^2+M_a^2)}$. Where Mach no.=velocity/speed of sound. The shock waves, generated by the rotor assembly will sweep over the outer wall of the annulus and propagate upstream and out of the engine intake. When the outer annulus wall is treated with an acoustic layer the propagating noise will be attenuated and a lower sound pressure level will be experienced at an upstream plane relative to an engine with the same hardware but with no acoustic treatment.

The buzz-saw noise arises from the production of non-uniform shock waves resulting from the blade-to-blade geometric differences associated with the manufacturing tolerances of the rotor blades. If all blades were manufactured identically then no buzz-saw noise would occur and rotor only noise would occur at blade passing frequencies and its harmonics. This noise would then be observed by a stationary observer relative to the rotor assembly. However such a reduction in tolerances will significantly increase the manufacturing cost of the rotor blades. FIG. 1 below shows an example, considering blade stagger angle alone, of the effect of a) all blades being identical b) the effect of one blade stagger angle being larger than the others. The shocks in a) are all of equal amplitude and spacing around the fan disk and no buzz-saw noise results whilst the shocks in b) are not equal and buzz-saw noise is generated. The diagram refers to an aerodynamic condition at part speed where the shocks become "detached". At this condition the shock non-uniformities for case b) are in fact known to be proportional to the difference in stagger angles. So that in b) $S_{n+1} \propto \Theta_{n+1}-\Theta_n$ (equation 1) where $S_{n+1}$ is the shock strength on the n+1 th blade, $\Theta_{n+1}$ is the stagger angle of the n+1 th blade and $\Theta_n$ is the stagger angle on the n th blade. At speeds closer to design the shocks may become "swallowed". In this case the shocks will depend upon the stagger angle.

At either condition the shocks will also have a dependence upon other blade-to-blade geometric differences such as thickness, camber, lean and leading edge blade angle. The harmonic frequencies of the buzz-saw noise are those of the harmonics of the disc rotational frequency of the fan called here engine orders. The invention is effective for either part speed conditions where the shocks are "detached" or at design conditions where the shocks are "swallowed".

From the above it will be appreciated that the principal problem relates to the non-uniformity of the rotating assembly geometry creating disparities in the regularity of shocks at the rotational speeds defined. These disparities with respect to the adjacent casing or duct wall cause the associated buzz-saw noise. The use of acoustic wall treatments to attenuate noise levels is inhibited by the variable nature of the frequencies of the noise as well as the nature of the acoustic wall treatment, which disproportionately attenuates noise at different frequencies.

Acoustic duct liner design for frequency and attenuation is usually compromised for different specific noise sources such as broadband noise or specific aircraft conditions such as approach, take-off or cruise. Therefore the attenuation-frequency spectrum characteristic of the duct liner are usually far from ideal for the buzz-saw noise source considered here. In such circumstances, previously greater effort has been placed upon improving blade manufacturing tolerances and assembly accuracy. Nevertheless, there are commercial as well as practical limits to such approaches, i.e. more accurately manufactured and assembled blades will greatly increase costs.

SUMMARY OF THE INVENTION

In accordance with the present invention there is provided a method of noise control for a plurality of blades mounted on a disc or hub to rotate within a housing whereby when rotating those blades cause noise, the method comprising;

a) Determination of a noise attenuation frequency spectrum within the housing and any attenuation means associated with that housing;

b) Determination of a noise frequency spectrum at the rotor face for the plurality of blades when specifically rotated; and, c) Rearranging specific blade positions upon the disc or hub to optimise the noise frequency spectrum for more consistency with the attenuation of the duct and any noise attenuation means for greater noise control.

Typically, the noise frequency spectrum is shifted by matching harmonic frequency distribution determinations.

Generally, determination of the noise frequency spectrum is performed by experiment or theory or by empirical means.

Additionally, for B uneven blades and when the acoustic liner in the duct is most effective in the engine order range N to m then it is necessary to arrange the blades around the disc or hub to ensure the 1 to (N−1) Fourier coefficients (i.e. a lower frequency point of the most effective frequency for the acoustic liner to attenuate) and m to (B−1) Fourier coefficients of either one or more combinations of stagger, thickness, camber, lean, and leading edge blade angle of the blade set are reduced.

Additionally, wherein the noise frequency spectrum at the rotor can be determined using an equation $S_{n+1} \propto \theta_{n+1}-\theta_n$ where $S_{n+1}$ is the shock strength on the n+1 th blade and $\theta_{n+1}$ is the stagger angle on the n+1 th blade and $\theta_n$ is the stagger angle on the n th blade.

In addition to the arrangement of blades to control noise, the plurality of the blades may be arranged to also provide unbalance, blade stress or flutter limitation and/or to reduce stagger differences between adjacent blades and/or to control the variation in spacing of rotational shocks affecting higher frequency noise and/or to minimise blade to blade geometric differences.

There may be a blade repository comprising a plurality of blades of known replacement response and one of those replacement blades may be used to replace a blade in the plurality of blades.

Also, in accordance with the present invention there is a noise control arrangement for a plurality of blades mounted on a disc or hub to rotate within a duct whereby when rotating those blades cause noise, the duct including noise attenuation means with varying attenuation frequency response dependent upon noise frequency, and the blades mounted in specific order upon the disc or hub to enhance, upon rotation, the proportion of noise at the harmonic frequencies of higher attenuation by the noise attenuation means.

Advantageously, the plurality of the blades are also arranged to provide rotor unbalance, blade stress or flutter limitation and/or to reduce blade stagger angle differences between adjacent blades and/or to control spacing of rotational shocks and/or to minimise blade to blade geometric differences.

The blade differences which determine the buzz-saw noise frequency spectrum are often found to be almost constant with fan speed despite the obvious blade untwist which occurs to the blade stagger angle when a rotating assembly is run. The buzz-saw noise frequency spectrum will therefore in most cases be dependent only upon the rotor speed and the blade to blade differences. If however the spectrum is expressed in terms of engine order instead of frequency where engine order is the frequency of the engine LP shaft rotation, then this engine ordered spectrum is to a large degree constant with rotor speed. Then by reordering the blades, the engine ordered spectrum can be optimised to the noise attenuation of the duct liner. Often this means that the blade set is only perfectly optimised at one critical speed but the benefits are spread over a wider range of speeds.

If a fan blade assembly consists of B unequal blades, then a buzz-saw noise prediction can be obtained using the following equation, $F_r(\theta_{n+1}-\theta_n)$ where $F_r$ is the rth Fourier coefficient for a set of blade stagger angles n=1 to B (equation 2). In this way the engine ordered amplitude can be calculated for each engine order r of the spectrum. It is not necessary to predict the absolute value of the buzz-saw noise but only to give the correct relative noise value given by any stagger angle, blade order or engine order.

Equation 2 can be modified for any other rotor blade parameter which buzz-saw noise may depend upon. So for example, if differences in blade thickness is an important factor in the buzz-saw noise then the buzz-saw noise prediction could include a term such as $F_r(t_n)$ where $F_r$ is the rth Fourier coefficient for a set of blade thicknesses of blades n=1 to B. Also if the blade shock is swallowed which it may be at some operating conditions the buzz-saw noise may depend upon stagger angle so that the buzz-saw noise prediction may include a term $F_r(\theta_n)$ where $F_r$ is the rth Fourier coefficient for a set of blade stagger angles n=1 to B. Other blade parameters which may control the shock and hence the buzz-saw noise spectrum are blade camber, blade lean and interblade spacing.

It has however been found that stagger angle difference is the most important cause of buzz-saw noise for the type of aeroengine fans most commonly encountered and at the aircraft conditions most critical to buzz-saw noise. In principle however the present method could be used for predicting the noise according to which blade parameter terms are most important for the rotating assembly design and/or aircraft condition. In accordance with the method the blades will then be reordered to optimise noise attenuation with the duct liner using the modified buzz-saw noise prediction.

Additionally the blades may also be arranged at the same time to provide a minimal moment weight unbalance and/or minimal unevenness of tip rub against the fan case and/or minimal blade flutter characteristics. Limits for these parameters can also be incorporated into the method.

BRIEF DESCRIPTION OF THE DRAWINGS

Embodiments of the present invention will now be described by way of example only and with reference to FIG. 2 and FIG. 3, in which.

DETAILED DESCRIPTION OF THE INVENTION

Figure 3:
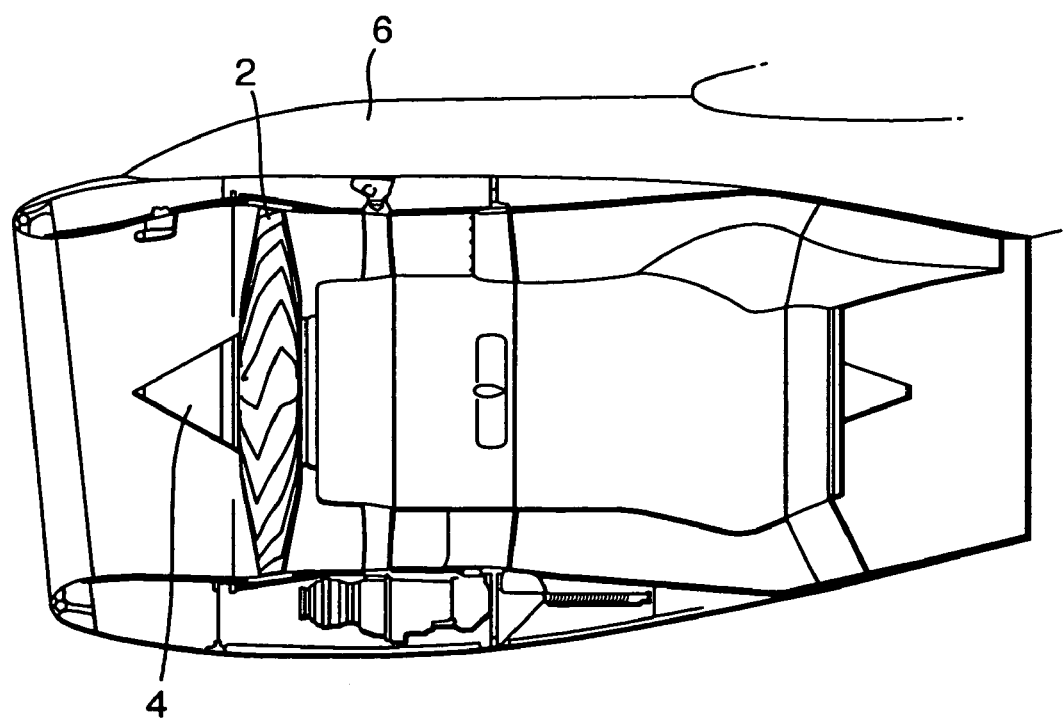
FIG. 3 depicts a typical gas turbine engine.

FIG. 3 is a schematic of a typical gas turbine engine. The engine comprises a fan assembly that has a plurality of blades 2 mounted on a disc or hub 4. The fan rotates within a housing 6 and helps to push air rewards thereby generating thrust.

Figure 1A:
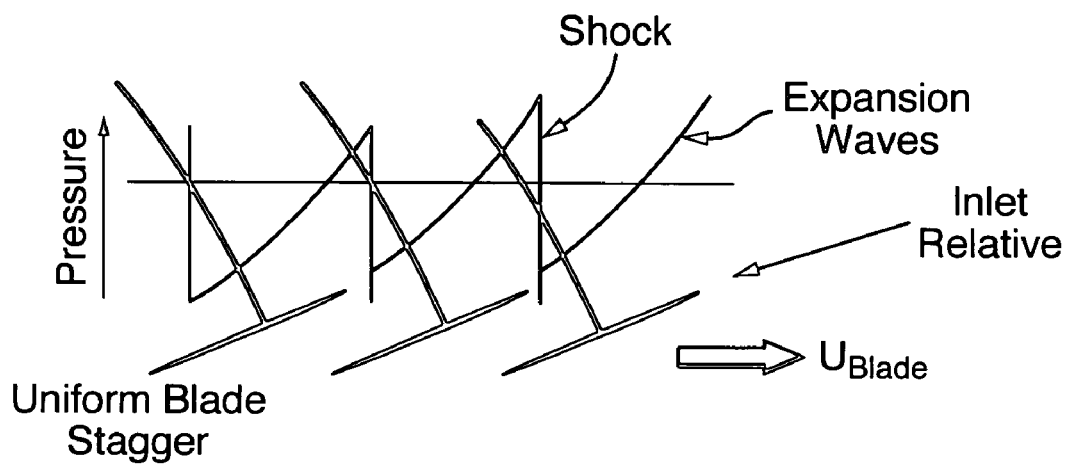
FIG. 1a depicts the shock wave effect upon a uniform blade stagger angle when all blades are geometrically identical.
Figure 1B:
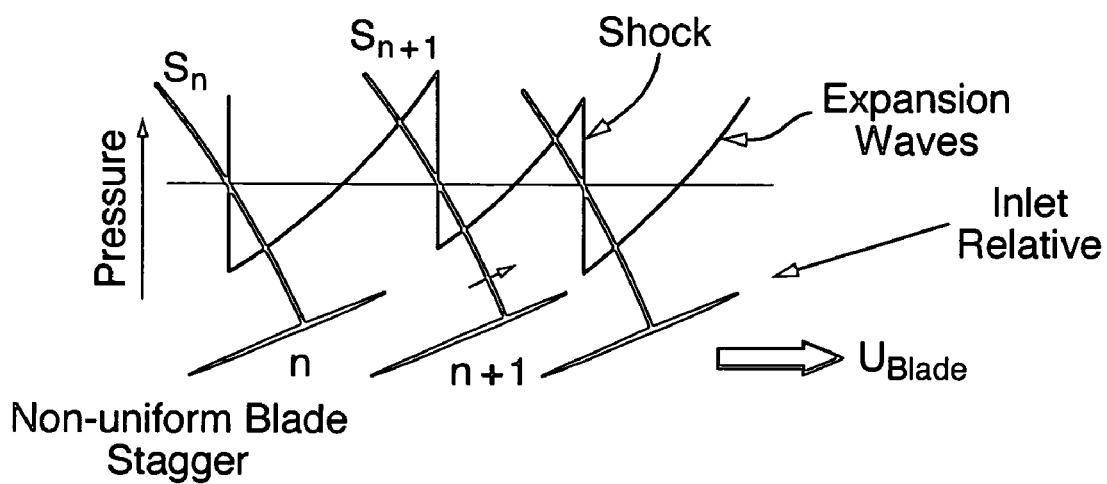
FIG. 1b depicts the shock wave effect upon a non-uniform blade stagger angle when one blade stagger angle is larger than the other blade stagger angles.
Figure 2A:
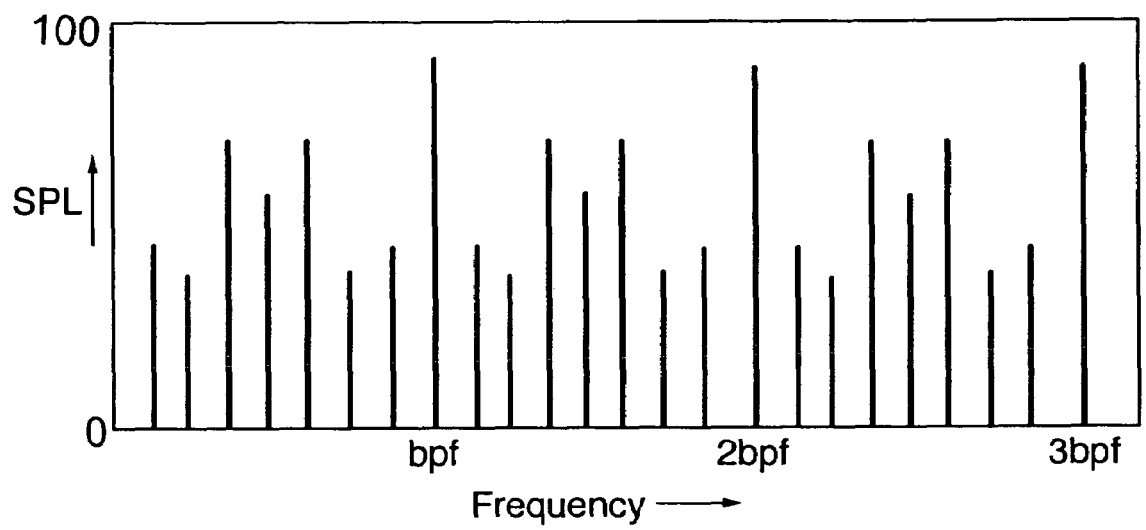
FIG. 2a depicts a typical buzz-saw noise spectrum.

Referring to FIG. 2a, if a fan assembly consists of B unequal stagger angles, the buzz-saw noise spectrum is predicted using the stagger angles of the blades in order around the disc according to equation 2 above for each engine order (r) of blades. FIG. 2a shows a typical predicted buzz-saw noise spectrum obtained in this way. We note that the spectral character is symmetric about engine orders 0.5B, 1.5, 2.5B and 3.5B (in fact this is true also for 4.5B, 5.5B, ... etc.). At each engine order B or multiple of B, the noise is that of the rotor-alone blade passing noise which would be produced even if there were no blade to blade differences. At other engine orders the noise is produced by the blade to blade differences (in this case stagger angle) and is in fact the buzz-saw noise of the fan.

This noise is characterized by the spectrum amplitude shape which in fact repeats between zero engine order and blade passing engine order and between every blade passing frequency harmonic (i.e. engine order B or multiple of B). Any change to the spectrum shape due to a different blade order will therefore be reflected between every blade passing harmonic.

Figure 2E:
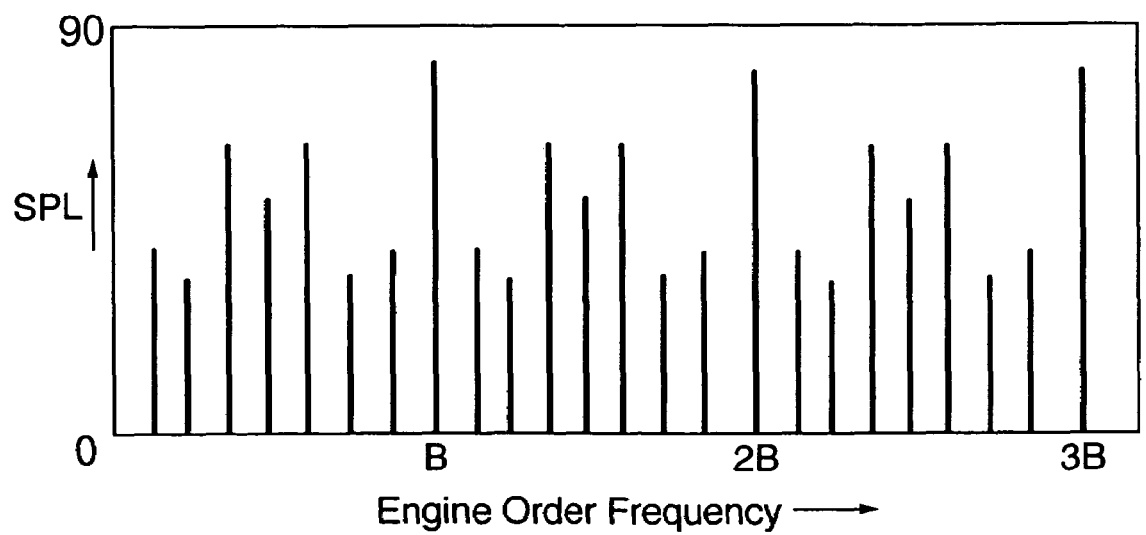
FIG. 2e shows an attenuation frequency spectrum, after attenuation.
Figure 2B:
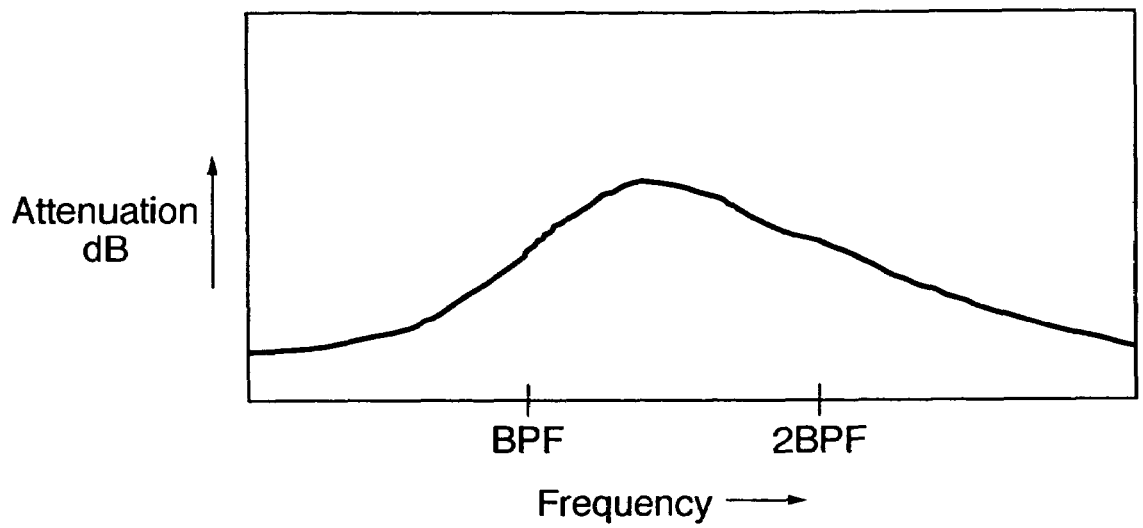
FIG. 2b depicts an acoustic liner attenuation spectrum.
Figure 2C:
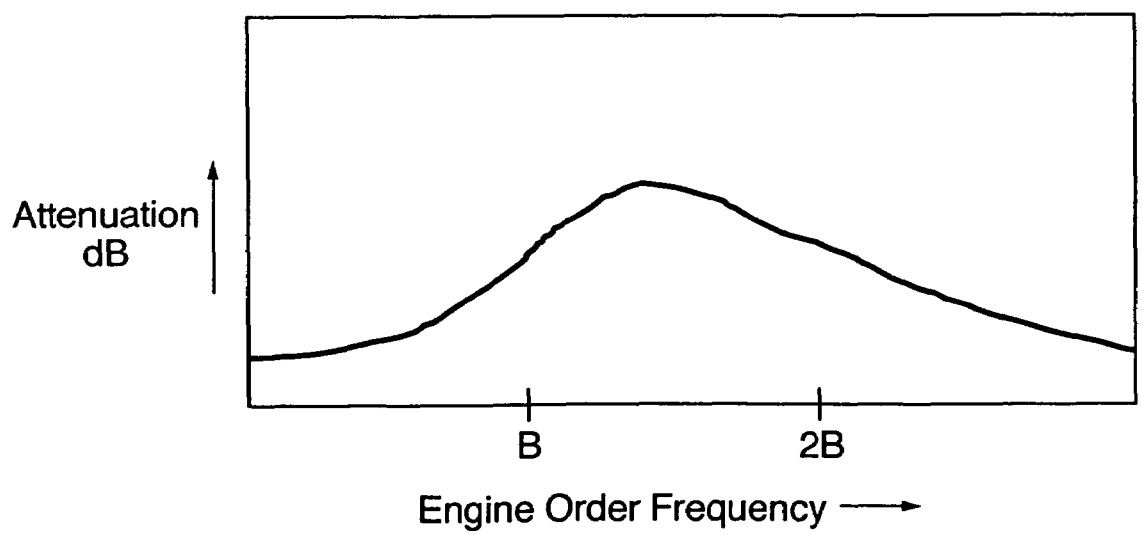
FIG. 2c depicts an attenuation frequency spectrum translated into an engine order spectrum.
Figure 2D:
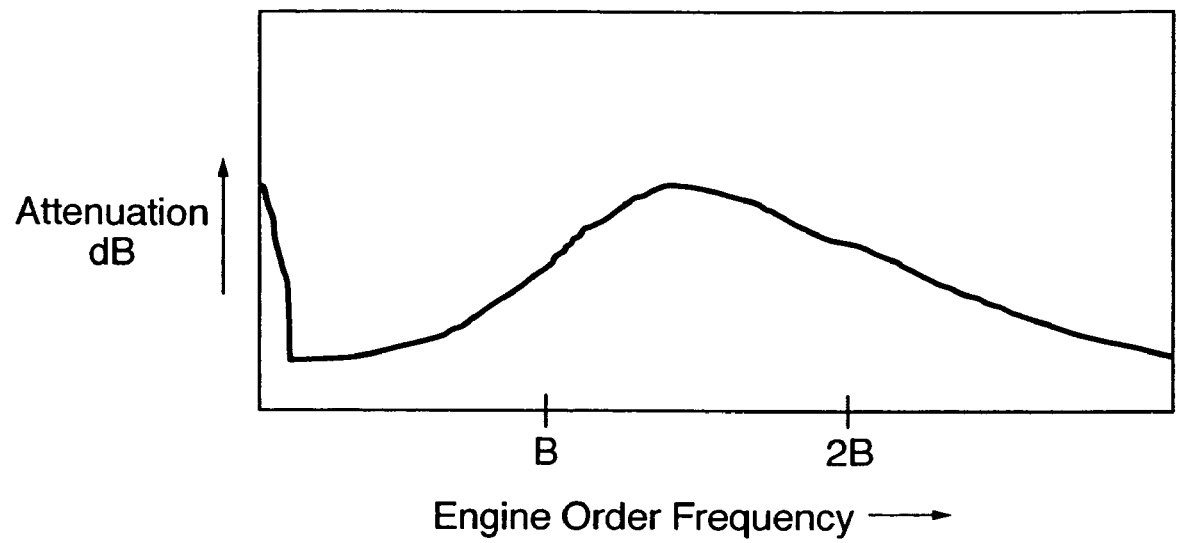
FIG. 2d shows a typical attenuation engine order spectrum of a duct/acoustic liner combination.

A particular design of acoustic liner may have an attenuation spectrum similar to that depicted in FIG. 2b (though in principle the liner could be designed to any frequency attenuation shape). At any particular rotational speed which may be deemed critical to noise, the attenuation frequency spectrum may be translated into an engine order spectrum from knowledge of the engine LP shaft rotation rate as in FIG. 2c. This attenuation spectrum of the liner becomes altered when incorporated into a duct due to cut-off effects. This occurs at low engine orders and can be calculated in a standard manner from knowledge of the fan blade number, blade tip Mach number, duct radius and Mach numbers of the flow within the duct. FIG. 2d shows a typical attenuation engine order spectrum of the duct/acoustic liner combination.

At each engine order the buzz-saw noise after propagation through the liner can now be obtained by simply subtracting the attenuation spectrum of the duct/liner in FIG. 2d from the predicted buzz-saw spectrum in FIG. 2a. Thus the spectrum after attenuation is obtained in FIG. 2e.

An algorithm may be created in the form of a computer program to calculate the predicted buzz-saw noise spectrum after attenuation in the manner described above. A new buzz-saw noise spectrum can quickly be calculated using the program if one blade pair is swapped. The program can also calculate the total noise difference between any two blade swaps. This total noise difference can be used to decide whether to keep the blade swap or not, i.e. if the total noise is reduced the blade swap is kept. The computer program can do very many blade swaps in this way and fairly quickly to find a blade order which has optimum noise. In principle what the computer program is doing is transferring the noise from engine blade orders where there is not much attenuation by the liner or duct, etc. to engine blade orders where there is more attenuation. The program does this by swapping blades around the fan disc until it finds the optimum blade order for optimum total noise. Note that the total number of possible blade arrangements around the fan disc is (B−1)! for an aeroengine fan with the number of blades being B=25, this would mean 24! or $6.204\times10^{23}$ ways of ordering the fan blades. In practice no computer is yet fast enough to test all these blade orders however the computer can fairly quickly obtain an optimum total noise after a few thousand swaps have been tried. Also there are other constraints to the blade order that the computer program has to make to reduce to some predefined limit the moment weight unbalance of the fan and to limit the degree of blade tip rub against the fan case. The method might be changed to also include limiting fan flutter or engine orders known to cause vibration in the fan and adjoining structures.

In this example, total noise between any two blade swaps was chosen as a measure of the success of the noise reduction. The total noise is merely an addition of square pressure amplitudes of the noise at each engine order. The total noise and the noise at each engine order is usually expressed as a SPL level in dB where the SPL is defined as 10 log (square pressure amplitude/reference value). It would equally be possible to use some other measure of noise as a way to optimize the blade order. For example, PNL or dBA. These units are also expressed like the total noise in dB but are frequency weighted to reflect the response of human ear. Frequency weightings could also be added to the method for atmospheric attenuation or aircraft cabin wall attenuation.

One important factor which can be added to the method is the influence on the noise of non-linear noise attenuation which occurs along the duct length. The non-linear noise attenuation for a given engine order noise spectrum at the rotor can be calculated for an acoustically lined duct for each engine order of the spectrum. The method would then proceed in exactly the same way as before except that the predicted duct liner attenuation would include these non linear effects and the predicted buzz-saw noise would more accurately reflect the actual buzz-saw noise at the exit of the duct. This addition to the method might be very beneficial since the non linear attenuation will increase the variation from shock on one blade to the shock on the next blade. Therefore at the end of the duct, the shocks will not only vary in amplitude from blade to blade but also in the circumferential position of the shocks. Since these variations in position can affect the higher frequencies of the buzz-saw spectrum, optimizing the spectrum using this modification could be also beneficial to the higher frequencies.

Another important factor which can be added to the method is the influence of non-correlated noise. For example, a prediction of noise using equation 2 will have some errors when compared to measured data. These errors can be included in the prediction by assuming they are uncorrelated with, for example, stagger angle. So for example, the prediction of noise using stagger angle differences alone becomes, $F_r(\theta_{n+1}-\theta_n)+F_r$ (errors) where error can be determined by the errors required to match the prediction to the measured data.

The method can also be combined with procedures for selecting blades from a blade repository to minimize certain blade to blade differences in a fan blade set.

Once the aeroengine is in service, the method in the form of a computer program could be used by the aeroengine owners to reorder the blades after blade replacements due to damage or some other reasons. Thus ensuring the fan remains optimized throughout it's life.

What is claimed is:

1. A method of noise control for a plurality of blades mounted on a disc or hub to rotate within a housing incorporating a duct having an acoustic liner whereby when rotating those blades cause noise, the method comprising;
   a) determining a noise attenuation frequency spectrum within the housing and any attenuation means associated with that of the housing, the noise frequency spectrum having frequencies of higher attenuation and frequencies of lower attenuation;
   b) determining a noise frequency spectrum at the rotor face for the plurality of blades when specifically rotated, the noise frequency spectrum having frequencies of higher noise level and frequencies of lower noise level; and,
   c) rearranging specific blade positions upon the disc or hub to increase the number of frequencies of higher noise level to match the frequencies of higher attenuation for greater noise control.

2. A method as claimed in claim 1 wherein the noise frequency spectrum is shifted by matching harmonic frequency distribution determinations.

3. A method as claimed in claim 1 wherein determination of the noise frequency spectrum is performed by experimental, theoretical or by empirical means.

4. A method as claimed in claim 1 wherein the noise attenuation spectrum and related duct effects are determined by experimental, theoretical or empirical means.

5. A method as claimed in claim 1 wherein for B uneven blades, and when the acoustic liner in the duct is most effective in an engine order range N to m, then it is necessary to arrange the blades around the disc or hub to ensure the 1 to (N−1) Fourier coefficients and m to (B−1) Fourier coefficients of either one or more combinations of stagger, thickness, camber, lean, and leading edge blade angle of the blade set are reduced.

6. A method as claimed in claim 1 wherein the noise frequency spectrum is determined using an equation $S_{n+1} \propto \theta_{n+1}-\theta_n$ where $S_{n+1}$ is the shock strength on the n+1 th blade and $\theta_{n+1}$ is the stagger angle on the n+1 th blade and $\theta_n$ is the stagger angle on the n th blade.

7. A method as claimed in claim 1 wherein there is a blade repository comprising a plurality of blades of known replacement response and one of those replacement blades used to replace a blade in the plurality of blades.

8. A method of noise control for a plurality of blades mounted on a disc or hub to rotate within a gas turbine engine housing incorporating a duct having an acoustic liner whereby when rotating those blades cause noise, the method comprising;

determining a noise attenuation frequency spectrum within the housing and any attenuation means associated with that of the housing, the noise frequency spectrum having frequencies of higher attenuation and frequencies of lower attenuation;

determining a noise frequency spectrum at the rotor face for the plurality of blades when specifically rotated, the noise frequency spectrum having frequencies of higher noise level and frequencies of lower noise level;

determining a total noise level produced by the rotor face; and rearranging specific blade positions upon the disc or hub to increase the number of frequencies of higher noise level to match the frequencies of higher attenuation to provide a reduced level of total noise.

9. Method according to claim 8, further comprising using a computer to determine the theoretical noise frequency spectrums for a plurality of different blade positions upon the disc or hub and selecting the noise frequency spectrum that provides the greatest reduced level of total noise.

10. Method according to claim 9, wherein the noise frequency spectrum is determined using an equation $S_{n+1} \propto \theta_{n+1} - \theta_n$ where $S_{n+1}$ is the shock strength on the n+1 th blade and $\theta_{n+1}$ is the stagger angle on the n+1 th blade and $\theta_n$ is the stagger angle on the n th blade.

11. A method according to claim 8, further comprising using a computer to determine the theoretical noise frequency spectrums for a plurality of different blade positions upon the disc or hub and selecting a blade order that provides the reduced level of total noise and provides a predetermined limit of a moment weight unbalance.

12. A method according to claim 1, further comprising using a computer to determine the theoretical noise frequency spectrums for a plurality of different blade positions upon the disc or hub and selecting a blade order that provides the increased number of frequencies of higher noise level to match the frequencies of higher attenuation and provides a predetermined limit of a moment weight unbalance.

* * * * *

UNITED STATES PATENT AND TRADEMARK OFFICE
CERTIFICATE OF CORRECTION

PATENT NO.        : 7,648,330 B2
APPLICATION NO. : 11/152505
DATED             : January 19, 2010
INVENTOR(S)       : Schwaller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Sixteenth Day of November, 2010

David J. Kappos
*Director of the United States Patent and Trademark Office*